United States Patent
Moreland et al.

(12)

(10) Patent No.: US 6,598,632 B1
(45) Date of Patent: *Jul. 29, 2003

(54) TIRE HAVING SIDEWALLS WHICH COMPRISE A VULCANIZED RUBBER COMPOSITION

(75) Inventors: John Calloway Moreland, Greer, SC (US); Claude Ringot, Riom (FR); Salvatore Pagano, Clermont-Ferrand (FR); Brooke Conger-Murray, Austin, TX (US); Janine Cartoux, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/707,575

(22) Filed: Nov. 7, 2000

(30) Foreign Application Priority Data

Nov. 8, 1999 (FR) .............................. 99 14097

(51) Int. Cl.$^7$ .................................. B60C 1/00
(52) U.S. Cl. ....................... 152/151; 152/525; 524/366; 524/367
(58) Field of Search ................ 524/366, 376; 152/151, 525; 525/366, 376

(56) References Cited

U.S. PATENT DOCUMENTS 4,033,933 A    7/1977  Shimizu
4,438,058 A  * 3/1984  Tanaka ........................ 264/51
5,714,533 A  * 2/1998  Hatakeyama et al. ....... 524/140

OTHER PUBLICATIONS

Database WP1, 1993, Derwent Publications, Ltd., AN1993–278380, XP 002140173 corresponding to JP 5194790.
Database WP1, 1993, Derwent Publications, Ltd., AN1993–261779, XP 00214074, corresponding to JP 5179067.
US patent application 09/801,520, filed Mar. 8, 2001.

* cited by examiner

*Primary Examiner*—Jeffrey Mullis
(74) *Attorney, Agent, or Firm*—Baker Botts, LLP

(57) ABSTRACT

The present invention relates to a tire the sidewalls of which comprise a vulcanized rubber composition. The composition comprises between 0.5 phr and 10 phr (weight parts per hundred parts of rubber) of at least one polymer which comprises an oxy group defined by the formula —O— and, linked to the one side of the oxy group, at least one polyoxyalkylene block according to the formula $(C_nH_{2n}O)_x$, where n is equal to 2 or 3 and x is equal to from 2 through 15 and the at least one block is linked to a hydrogen atom at the chain end, so that the hydrogen atom forms an alcohol function with the terminal oxygen atom of the block. According to the invention, the polymer comprises, linked to the other side of the oxy group, an aliphatic moiety selected from the group consisting of a blend of aliphatic alkyl chains having an average number of carbon atoms of from 10 through 14, and an aliphatic chain which comprises an alkyl chain having 13 carbon atoms.

15 Claims, No Drawings

TIRE HAVING SIDEWALLS WHICH COMPRISE A VULCANIZED RUBBER COMPOSITION

BACKGROUND OF THE INVENTION

It is known that certain rubber compositions are very sensitive to the action of ozone. Vulcanized rubber compositions based on dienic elastomers are particularly sensitive.

When an article made with such a vulcanized elastomer composition is subjected to the action of prolonged static and dynamic stresses in the presence of ozone, some more or less marked cracks which can be seen on the surface of the article appear. These cracks are oriented perpendicularly to the direction of the stress, and their growth under the effect of said remaining stress may cause complete failure of the article.

In order to minimize these effects of ozone, antiozone compounds, which are designed to slow down the formation and propagation of the cracks under static and dynamic stressing conditions, are commonly incorporated into these articles and, particularly, into the sidewalls based on elastomers that are included in tires. Waxes are also commonly used to provide additional static protection by forming a protective coating on the surface of the sidewalls.

The association of antiozone compounds and waxes has proven to be effective for the minimization of cracks at the surface of the sidewalls.

Unfortunately, the most effective antiozone compounds also have a very high tendency to migrate through their polymeric substrate, which results in staining and coloring of the surfaces that are adjacent to said substrate. More precisely, yellowish or brown stains appear at the surface of the sidewalls. This phenomenon is called "coloration".

The Japanese Patent Document JP-A-5 194790 discloses, in a rubber composition for the sidewalls of a tire comprising at least one elastomer, the use of several specific polymeric surfactants of the polyoxyethylene ether type, in order to cope with the "coloration" phenomenon. Those particular surfactants are characterized by a hydrophilic-lipophilic balance (HLB) which is comprised between 1 0.7 and 15.0, and they are made of polyoxyethylene nonylphenylether, polyoxyethylene stearylether, or polyoxyethylene oleylether.

SUMMARY OF THE INVENTION

The present invention relates to a tire including sidewalls which comprise a vulcanized rubber composition based on at least one elastomer. The invention is useful for the protection of a tire against the effects of migrations of antioxidants and antiozonants compounds incorporated in the sidewalls, which effects can be seen on the outer faces of the sidewalls.

DETAILED DESCRIPTION OF THE INVENTION

A tire according to the invention includes sidewalls which comprise a rubber composition, wherein the rubber composition comprises between 0.5 phr and 10 phr (weight parts per hundred parts of rubber) of at least one polymer which comprises an oxy group having the formula —O— and, linked to the one side of the oxy group, at least one polyoxyalkylene block having the formula $(C_nH_{2n}O)_x$, where n is 2 or 3, where x is an integer or decimal number from 2 through 15, wherein the block is linked to an hydrogen atom which is located at the chain end of the polymer, such that the hydrogen atom forms an alcohol function with the terminal oxygen atom of the block, and linked to the other side of the oxy group, an aliphatic moiety selected from the group consisting of:
 a blend of aliphatic alkyl chains having an average number of carbon atoms from 10 through 14, and
 an aliphatic alkyl chain having 13 carbon atoms.

The sidewalls of the tires of the present invention have an uniform black appearance which is durable and therefore significantly enhances the aesthetic appearance of the tires.

According to one embodiment of the invention, the aliphatic moiety is a blend of aliphatic alkyl chains having an average number of carbon atoms from 10 through 14.

In a preferred embodiment, the average number of carbon atoms is substantially equal to 14, and the at least one block consists of a sole polyoxyethylene block wherein x is equal to 4. Then, the hydrophilic-lipophilic balance (HLB) of said polymer is substantially equal to 9.1.

This embodiment wherein the average number of carbon chains is substantially equal to 14 not only provides a black color for the whole outer surface of the sidewalls, but also a glossy appearance for the surface which further enhances the sidewalls.

In another preferred embodiment, the average number of carbon atoms is substantially equal to 14, and the at least one block consists of: a polyoxypropylene block wherein x is equal to 5, and a polyoxyethylene block wherein x is equal to 4.

Then, the HLB of the polymer is substantially equal to 9.5.

Again in this particular embodiment, a glossy black color is obtained for the sidewalls.

In another preferred embodiment, the average number of carbon atoms is substantially equal to 12, and the at least one block consists of a sole polyoxyethylene block wherein x is equal to 7.

Then, the HLB of the polymer is substantially equal to 12.6.

Again in this particular embodiment, a glossy black color is obtained for the sidewalls.

In another preferred embodiment, the average number of carbon atoms is substantially equal to 14, and the at least one block consists of a sole polyoxyethylene block wherein x is equal to 2.

Then, the HLB of the polymer is substantially equal to 5.9.

Again in this particular embodiment, a glossy black color is obtained for the sidewalls.

In another preferred embodiment, the average number of carbon atoms is substantially equal to 10, and the at least one block consists of a sole polyoxyethylene block wherein x is equal to 2.5.

Then, the HLB of the polymer is substantially equal to 8.2.

Again in this particular embodiment, a glossy black color is obtained for the sidewalls.

According to another embodiment of the invention, the aliphatic moiety which is linked to said oxy group consists of a tridecyl group, and the at least one block consists of a sole polyoxyethylene block wherein number x is equal to 3.

Then, the HLB of said polymer is substantially equal to to 8.6.

The tires of the invention may be made using processes known to those of skill in the art. The polymers m a y be synthesized by standard organic chemistry methods or may be obtained commercially.

The following examples serve to further illustrate the present invention.

EXAMPLE 1

Several tires have been manufactured, each of them including sidewalls with a determined vulcanized rubber composition according to the invention, in comparison with a "witness" tire including sidewalls with a usual vulcanized rubber composition.

All the rubber compositions that have been tested are detailed in the following Table I (witness composition and compositions 1 to 8 according to the invention), the quantity of every compound in each composition being expressed in phr therein (weight parts per hundred parts or rubber, said rubber corresponding to butadiene rubber and natural rubber in these preferred embodiments).

In Table I,
- carbon black is a conventional carcasse grade carbon black,
- wax is an antiozone wax,
- aromatic oil is a heavy oil,
- "DMBPPD" represents the N-(1,3-dimethyl butyl)-N'-phenyl-p-phenylenediamine, antioxygen and antiozone compound, and
- "CBS" represents the N-cyclohexyl-benzothiazyl-sulfenamide, a vulcanization accelerator.

Moreover, each rubber composition referred to in Table I conventionally contains an antioxygen compound, such as "TMQ" (which stands for trimethylquinoline, a polymerized 1,2-dihydro-2,2,4-trimethylquinone).

SYNPERONIC A4 is the trade name of a surfactant sold by UNIQEMA, (Wilmington, Del.) whose HLB is substantially equal to 9.1, which is made up of a polymer comprising, linked to the one side and to the other side of an oxy radical of formula —O—, respectively, a blend R of alkyl groups and one block of polyoxyethylene, according to the formula

R—O—(C$_2$H$_4$O)$_4$—H, where the alkyl groups are aryclic ones that comprise from 13 to 15 atoms of carbon (14 in average).

More precisely, said polyoxyethylene block is linked to an hydrogen atom which is located at a chain end of this polymer, in such a manner that said hydrogen atom forms an alcohol function with the terminal oxygen atom of the polyoxyethylene block.

SYNPERONIC LF/RA 280 is the trade name of a surfactant sold by UNIQEMA, whose HLB is substantially equal to 9.5, which is made up of a polymer comprising, linked to the one side and to the other side of an oxy radical —O—, respectively, a blend R of alkyl groups and two blocks polyoxyethylene and polyoxypropylene, according to the formula

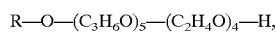
R—O—(C$_3$H$_6$O)$_5$—(C$_2$H$_4$O)$_4$—H, where the alkyl groups comprise from 13 to 15 carbon atoms (14 in average), and where the hydrogen atom at the chain end of the polymer also forms an alcohol function with the terminal oxygen atom of said polyoxyethylene block.

SYNPERONIC L7 is the trade name of a surfactant sold by UNIQEMA, whose HLB is substantially equal to 12.6, which is made up of a polymer comprising, linked to the one side and to the other side of an oxy radical —O—, respectively, a blend R of alkyl groups and one block of polyoxyethylene, according to the formula

R—O—(C$_2$H$_4$O)$_7$—H, where the alkyl groups comprise an average number of carbon atoms that is substantially equal to 12, and where the hydrogen atom at the chain end of the polymer also forms an alcohol function with the terminal oxygen atom of the polyoxyethylene block.

SYNPERONIC A2 is the trade name of a surfactant sold by UNIQEMA, whose HLB is substantially equal to 5.9, which is made up of a polymer comprising, linked to the one side and to the other side of an oxy radical —O—, respectively, a blend R of alkyl groups and one block of polyoxyethylene, according to the formula

R—O—(C$_2$H$_4$O)$_2$—H, where the alkyl groups comprise an average number of carbon atoms that is substantially equal to 14, and where the atom of hydrogen at the chain end of the polymer also forms an alcohol function with the terminal oxygen atom of the polyoxyethylene block.

SYNPERONIC 91/2.5 is the trade name of a surfactant sold by UNIQEMA, whose HLB is substantially equal to 8.2, which is made up of a polymer comprising, linked to the one side and to the other side of an oxy radical —O—, respectively, a blend R of alkyl groups and one block of polyoxyethylene, according to the formula

R—O—(C$_2$H$_4$O)$_{2.5}$—H, where the alkyl groups comprise between 9 and 11 atoms of carbon, and where the hydrogen atom at the chain end of the polymer also forms an alcohol function with the terminal oxygen atom of the polyoxyethylene block.

SYNPERONIC 13/3 is the trade name of a surfactant sold by UNIQEMA, whose HLB is substantially equal to 8.6, which is made up of a polymer comprising, linked to the one side and to the other side of an oxy radical —O—, respectively, a tridecyl group and one block of polyoxyethylene, according to the formula

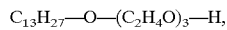
C$_{13}$H$_{27}$—O—(C$_2$H$_4$O)$_3$—H, where the hydrogen atom at the chain end of the polymer also forms an alcohol function with the terminal oxygen atom of the polyoxyethylene block.

TABLE I

| Compounds | <<witness>> | Comp. 1 | Comp. 2 | Comp. 3 | Comp. 4 | Comp. 5 | Comp. 6 | Comp. 7 | Comp. 8 |
|---|---|---|---|---|---|---|---|---|---|
| butadiene rubber | 65 | 65 | 65 | 65 | 65 | 65 | 65 | 65 | 65 |
| natural rubber | 35 | 35 | 35 | 35 | 35 | 35 | 35 | 35 | 35 |
| carbon black | 60 | 60 | 60 | 60 | 60 | 60 | 60 | 60 | 60 |
| wax | 1 | 1 | 1 | 1 | 1 | 1 | 1 | 1 | 1 |
| stearic acid | 1 | 1 | 1 | 1 | 1 | 1 | 1 | 1 | 1 |
| ZnO | 3 | 3 | 3 | 3 | 3 | 3 | 3 | 3 | 3 |
| DMBPPD | 3 | 3 | 3 | 3 | 3 | 3 | 3 | 3 | 3 |
| aromatic oil | 21 | 21 | 21 | 21 | 21 | 21 | 21 | 21 | 21 |
| S | 1.7 | 1.7 | 1.7 | 1.7 | 1.7 | 1.7 | 1.7 | 1.7 | 1.7 |
| CBS | 1 | 1 | 1 | 1 | 1 | 1 | 1 | 1 | 1 |
| SYNPERONIC A4 |  | 2 | 3 |  |  |  |  |  |  |
| SYNPERONIC LF/RA 280 |  |  |  | 2 | 3 |  |  |  |  |
| SYNPERONIC L7 |  |  |  |  |  | 2 |  |  |  |
| SYNPERONIC A2 |  |  |  |  |  |  | 2 |  |  |
| SYNPERONIC 91/2.5 |  |  |  |  |  |  |  | 2 |  |
| SYNPERONIC 13/3 |  |  |  |  |  |  |  |  | 2 |

Each tire whose sidewalls include one of the rubber compositions according to the invention was tested, in order to determine the following properties:

The plasticity and scorch values (t5), measured according to ASTM D1646.

The Shore A Hardness values, measured according to ASTM D2240, with a device whose name is "Durometer of type A".

The M300 values, measured according to ASTM D412, Test Method A.

The coloration phenomenon after ozone static rubber test "S18" ("Stat. Test" in Table II):

The S18 test was carried out according to ASTM D1149, except that each sample was a 20×145 mm one, in place of a 10×100+/−25 mm one that is specified in ASTM D1149.

The samples, which respectively contain the witness composition and compositions 1 to 8 according to the invention, were hung on a rod for 2 days in the laboratory (under normal atmosphere) and then in an ozone chamber for 14 days (the ozone concentration in the chamber was 50 pphm at 38° C.).

The coloration phenomenon of each sample was evaluated in the end of this static test, by means of a subjective rating system.

The subjective rating system consists of an appearance rate ("appear. rate" in Table II), which can vary from 0 to 4.

More precisely, the possible values of said appearance rate respectively correspond to the following appearances:
4 is glossy black, 3 is black, 2 is matte black, 1 is lightly colored and 0 is colored.

The color of each sample in the end of said static test is reported in Table II.

Coloration after a specific ozone dynamic rubber test ("Dyn. Test" in Table II):

The specific dynamic test was derived from the Standard D25 Test which is carried out according to ASTM D3395, namely with an ozone concentration of 50 pphm at 38° C. that is specified therein.

Each sample was a 20×145 mm one, in place of a 10×100+/−25 mm one that is specified in ASTM D3395.

However, whereas the Standard D25 Test is designed to evaluate the severity of cracking, the specific dynamic test that was run here has particularly been used to evaluate in the end of it the coloration phenomenon of each sample, by means of the above-referred subjective rating system.

In fact, the specific dynamic test also differs from the Standard D25 Test, in that each sample was run for approximately 10 days, namely 1.5 week instead of the 2 days specified in ASTM D3395.

The color of each sample in the end of said specific dynamic test is reported in Table II, as for the static test.

TABLE II

|  | Witness | Comp. 1 | Comp. 2 | Comp. 3 | Comp. 4 | Comp. 5 | Comp. 6 | Comp. 7 | Comp. 8 |
|---|---|---|---|---|---|---|---|---|---|
| Plasticity | 45 | 49 | 43 | 49 | 45 | 48 | 51 | 51 | 50 |
| Shore | 55 | 57 | 57 | 58 | 55 | 57 | 58 | 57 | 58 |
| M300 | 6.8 | 7.3 | 7.4 | 7.5 | 6.8 | 7.2 | 7.1 | 7.1 | 7.9 |
| Scorch | 20 | 16 | 15 | 18 | 17 | 15 | 17 | 17 | 18 |
| Stat. Test |  |  |  |  |  |  |  |  |  |
| Appear. Rate | 2 | 3 | 3 | 3 | 4 | 3 | 4 | 4 | — |
| color | matte black | black | black | black | glossy black | black | glossy black | glossy black | — |

TABLE II-continued

|  | Witness | Comp. 1 | Comp. 2 | Comp. 3 | Comp. 4 | Comp. 5 | Comp. 6 | Comp. 7 | Comp. 8 |
|---|---|---|---|---|---|---|---|---|---|
|  |  |  |  | Dyn. Test |  |  |  |  |  |
| Appear. rate | 0 | 3 | 4 | 3 | 3 | 4 | 2 | 2 | 2 |
| color | brown | black | glossy black | black | black | glossy black | matte black | matte black | matte black |

Table II shows that after being exposed to an ozone atmosphere and in comparison with the "witness", a sample which comprises any of the vulcanized rubber compositions according to the present invention, exhibited:

no coloration phenomenon either under static or dynamic ozone exposure (namely a black color instead of a brown one for the "witness"), and more particularly for the samples including rubber compositions 2, 4, 5, 6 and 7, a glossy black surface which further improves the appearance of the corresponding tires.

Moreover, Table II shows that the samples which comprise a rubber composition according to the invention are characterized by good mechanical properties.

In addition, it was determined whether the surface of the samples according to the invention remained intact under washing conditions.

For this purpose, the ozone dynamic Standard "D25 Test" was run for two weeks and each sample was washed six times intermittently during these two weeks, with various cleaners including deionized water and two commercial tire cleansers, which are sold under the trade names BLECHE-WHITE and ARMOR ALL.

After such washings, each sample comprising a vulcanized rubber composition according to the invention looked black, whereas the "witness" sample exhibited varying shades of brown, depending on the cleanser that had been used.

Moreover, each sample according to the invention showed no cracking under all these washing conditions.

It is to be noted that the above-described examples are designed to illustrate the present invention, which means that they should not be construed as limiting its scope.

What is claimed is:

1. A tire including sidewalls which comprise a vulcanized rubber composition comprising between 0.5 phr and 10 phr (weight parts per hundred parts of rubber) of at least one polymer, said polymer comprising an oxy group having by the formula —O— and, linked to one side of said oxy group, at least one polyoxyalkylene block having the formula $(C_nH_{2n}O)_x$, wherein n is an integer equal to 2 or 3, wherein x is an integer or decimal number from 2 through 15, wherein said at least one block is linked to a hydrogen atom which is located at the chain end of said at least one polymer, such that said hydrogen atom forms an alcohol function with the terminal oxygen atom of said block, wherein said at least one polymer comprises, linked to the other side of said oxy group, an aliphatic moiety selected from the group consisting of an aliphatic alkyl chain having an average number of carbon atoms of from 10 through 14, and an aliphatic chain which comprises an alkyl chain having 13 carbon atoms.

2. A tire according to claim 1, wherein said aliphatic moiety is a blend of aliphatic alkyl chains having an average number of carbon atoms of from 10 through 14.

3. A tire according to claim 2, wherein said average number of carbon atoms is equal to about 14, and said at least one block consists of a sole polyoxyethylene block in which x is equal to 4.

4. A tire according to claim 3, wherein the hydrophilic-lipophilic balance (HLB) of said polymer is equal to about 9. 1.

5. A tire according to claim 2, wherein said average number of carbon atoms is equal to about 14, and said at least one block consists of a polyoxypropylene block one wherein x is equal to 5, and
a polyoxyethylene block wherein x is equal to 4.

6. A tire according to claim 5, wherein the hydrophilic-lipophilic balance (HLB) of said polymer is equal to about 9.5.

7. A tire according to claim 2, wherein said average number of carbon atoms is equal to about 12, and said at least one block consists of a sole polyoxyethylene block in which x is equal to 7.

8. A tire according to claim 7, wherein the hydrophilic-lipophilic balance (HLB) of said polymer is equal to about 12.6.

9. A tire according to claim 2, wherein said average number of carbon atoms is equal to about 14, and said at least one block consists of a sole polyoxyethylene block in which x is equal to 2.

10. A tire according to claim 9, wherein the hydrophilic-lipophilic balance (HLB) of said polymer is equal to about 5.9.

11. A tire according to claim 2, wherein said average number of carbon atoms is equal to about 10, and said at least one block consists of a sole polyoxyethylene block in which x is equal to 2.5.

12. A tire according to claim 11, wherein the hydrophilic-lipophilic balance (HLB) of said polymer is equal to about 8.2.

13. A tire according to claim 1, wherein said aliphatic moiety consists of a tridecyl group, and said at least one block consists of a sole polyoxyethylene block in which x is equal to 3.

14. A tire according to claim 13, wherein the hydrophilic-lipophilic balance (HLB) of said polymer is equal to about 8.6.

15. A tire according to claim 1, wherein said vulcanized rubber composition comprises at least one antiozone compound.

* * * * *

UNITED STATES PATENT AND TRADEMARK OFFICE
CERTIFICATE OF CORRECTION

PATENT NO.         : 6,598,632 B1
APPLICATION NO. : 09/707575
DATED                 : July 29, 2003
INVENTOR(S)       : Moreland et al.

It is certified that error appears in the above-identified patent and that said Letters Patent is hereby corrected as shown below:

Column 1, line 45: "1 0.7" should read -- 10.7 --

Column 2, line 18: "an" should read -- a --

Column 3, line 9: "to" (second occurrence) should be deleted

Column 3, line 13: "m a y " should read -- may --

Column 3, line 36: "carcasse" should read -- carcass --

Column 3, line 60: "aryclic" should read -- acyclic --

Column 7, line 49: "by" should be deleted

Column 7, line 63: "¶an" should read -- an -- (i.e., append to previous line)

Column 8, line 24: "9. 1." should read -- 9.1. --

Column 8, line 28: "one" should be deleted

Signed and Sealed this

Twenty-ninth Day of August, 2006

JON W. DUDAS
*Director of the United States Patent and Trademark Office*